United States Patent [19]

Boysel et al.

[11] Patent Number: 5,178,728
[45] Date of Patent: Jan. 12, 1993

[54] INTEGRATED-OPTIC WAVEGUIDE DEVICES AND METHOD

[75] Inventors: Robert M. Boysel, Plano; Gregory A. Magel, Dallas, both of Tex.

[73] Assignee: Texas Instruments Incorporated, Dallas, Tex.

[21] Appl. No.: 676,688

[22] Filed: Mar. 28, 1991

[51] Int. Cl.$^5$ .................................. H01L 21/00
[52] U.S. Cl. .................. 156/656; 427/162; 156/655; 156/657
[58] Field of Search ............... 427/162; 156/655, 656, 156/657

[56] References Cited

U.S. PATENT DOCUMENTS

| | | | |
|---|---|---|---|
| 4,087,315 | 5/1978 | Auracher et al. | 156/657 |
| 4,575,919 | 3/1986 | Logan et al. | 427/162 |
| 4,735,677 | 4/1988 | Kawachi et al. | 156/657 |
| 4,749,245 | 6/1988 | Kawatsuhi et al. | 427/162 |

*Primary Examiner*—Brian E. Hearn
*Assistant Examiner*—George Goudreau
*Attorney, Agent, or Firm*—Julie L. Reed; James C. Kesterson; Richard L. Donaldson

[57] ABSTRACT

It is possible to utilize changes in the complex effective refractive index caused by bringing a metal membrane in close proximity to the core of an optical waveguide to form many devices. The invention described herein provides structures and processes that do so, the structure comprising a substrate, a lower cladding, a waveguide core, a removable upper cladding which supports a metal membrane, and an electrode for deflecting said membrane.

Switchable devices using this structure include, but are not limited to, polarizers, mode converters, optical switches, Bragg devices, directional couplers and channel waveguides.

13 Claims, 4 Drawing Sheets

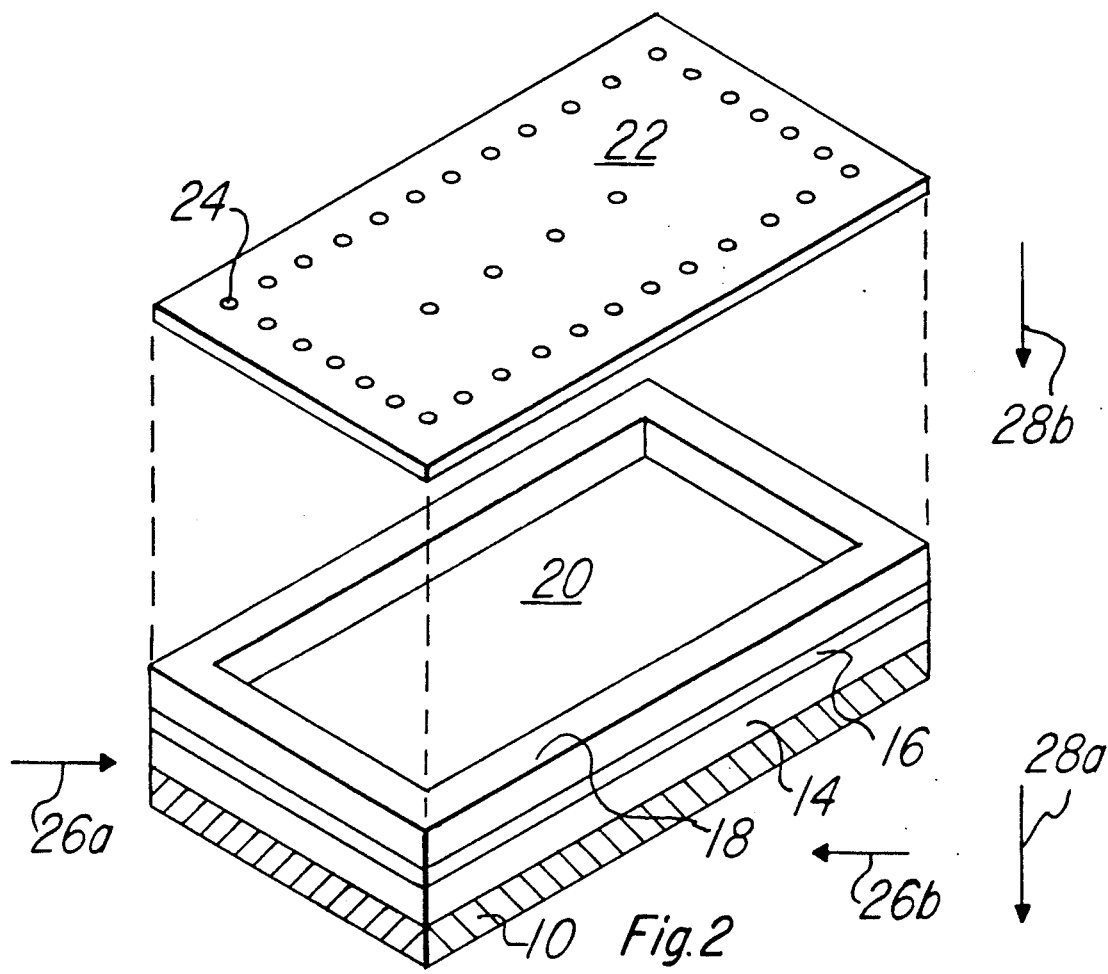
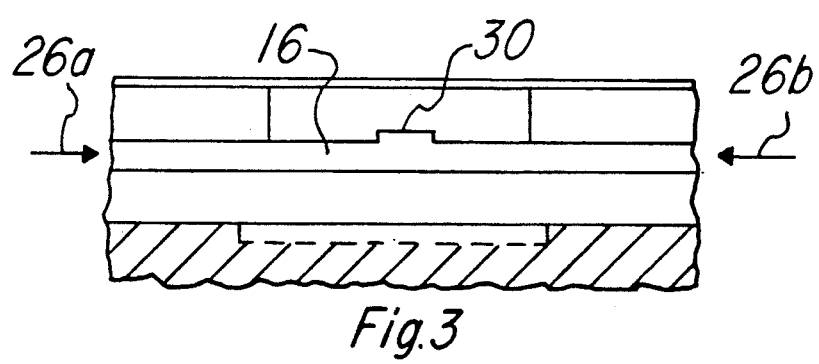

INTEGRATED-OPTIC WAVEGUIDE DEVICES AND METHOD

FIELD OF THE INVENTION

This invention deals with optical waveguide devices, more particularly with integrated-optic waveguide devices.

BACKGROUND OF THE INVENTION

Integrated-optic waveguides normally consist of a layer of lower cladding deposited upon a substrate, a layer of a core material deposited upon the layer of cladding, and another layer of cladding deposited on top of the core. The two layers of cladding need not be of the same material. Indeed, the top layer is sometimes air. Also, the lower cladding may be the substrate. The index of refraction, $n_{core}$, for the core must be significantly greater than the index of refraction for both claddings. This difference causes the peak intensity of the optical mode to be contained in the core while the "tails" of the mode extend into the cladding.

The complex index of refraction for a material may be written as follows:

$$\bar{n} = n + ik$$

where k is the absorption variable, which, as shown above, is the imaginary part of the complex refractive index. In most cladding materials, it is desired that the k be very small, so the refractive index approximately equals n. The effective index for a guided mode is a function of both the core and cladding indices since the mode extends into the claddings, and is thus also complex-valued.

Metals, which can be used as a cladding, possess a relatively large value for k. This larger value results in more of the light being absorbed than with a dielectric cladding, making a metal-clad waveguide very lossy. The amount of loss in the waveguide is a function if interaction length of the metal, the proximity of metal to the core, and the direction of polarization of the mode. This apparently undesirable property can make metal in optical waveguides very useful. It is possible to effectively change the imaginary part, $k_{eff}$, of the effective index of the guided mode by bringing metal into close range or contact with the core, the metal acting like a switch or attenuator. Additionally, metal can be used to alter the real part of the effective index, $n_{eff}$, to create devices such as directional coupler switches, switchable Bragg deflectors, and the like.

Using the processing techniques developed in deformable mirror device (DMD) technology, it is possible to form a waveguide with a metal membrane supported upon the upper cladding. The membrane can be controlled to bring it into proximity with the core to alter the effective index of the guided mode.

SUMMARY OF THE INVENTION

Other objects and advantages will be obvious, and will in part appear hereinafter and will be accomplished by the present invention which provides structure for the control of light in integrated-optic waveguides. The device is fabricated by placing at least one electrode in a substrate, forming a lower cladding layer upon said substrate, laying down a core upon said lower cladding, covering said core with a layer of spacer, covering said spacer with a metal membrane with holes. After the device is thus formed, the spacer is removed via an etch through the holes to form a deflectable metal membrane suspended over an air gap under which lies an electrode.

Having fabricated such a device, it is possible to control the deflection of the membrane so as to produce various effects in the guided mode of light. These effects can be embodied in various devices which include, but are not limited to, ON/OFF switches, switchable polarizers, switchable Bragg devices, switchable mode converters, and switchable directional couplers.

BRIEF DESCRIPTION OF THE DRAWINGS

For a complete understanding of the invention, and the advantages thereof, reference is now made to the following description in conjunction with the accompanying drawings, in which:

FIG. 2 shows a perspective view of an integrated-optic waveguide device.

FIG. 3 shows a cross-sectional view of a channelized waveguide device.

DESCRIPTIONS OF THE PREFERRED EMBODIMENTS

Figure 1A:
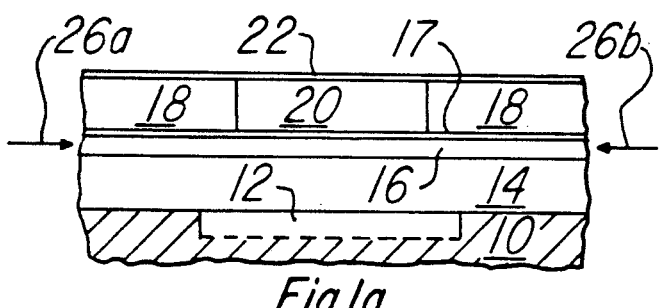
FIG. 1a shows a cross-sectional view of an integrated-optic waveguide device.

FIG. 1a shows a cross-section of an integrated-optic waveguide device. Substrate 10 is doped with material to make it conductive and to form an electrode 12. This electrode could also be deposited. Lower dielectric cladding 14, possibly silicon dioxide ($SiO_2$), is formed on the substrate 10 with its doped or deposited electrode 12. The dielectric core 16, possibly silicon nitride ($Si_3N_4$), is then put down onto the lower cladding 14. Upper cladding 18, which may or may not be the same material as the lower cladding 14, must be of a material which can be selectively and isotropically etched. Optional dielectric buffer layer 17, which will not be removed by the upper cladding etch, can be formed on the core before the upper cladding so as to enhance or reduce absorption of the guided mode during operation of the device. The metal membrane 22, in this case aluminum (Al), is then put down upon the upper cladding.

Metal membrane 22 has minute holes in it, shown in the perspective drawing FIG. 2, for etching out the upper cladding 18. In this case the upper cladding is an organic polymer spacer. The holes in the membrane 22 are placed so as to allow the center of the spacer 18 to be etched out, leaving the edges of the membrane supported by the remaining spacer, with an air gap 20 between the core 16 and the membrane 22, or between the optional layer 17 and the membrane 22.

Figure 1B:
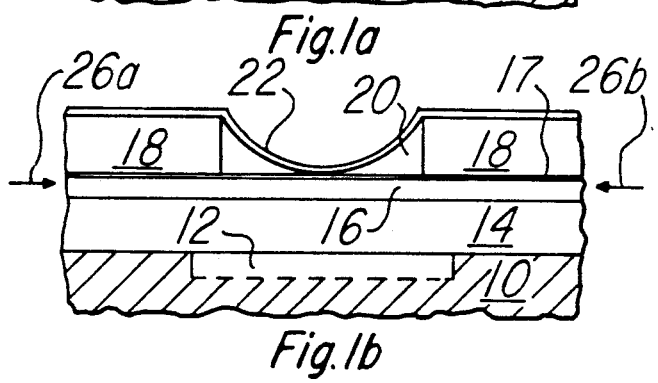
FIG. 1b shows a cross-sectional view of an integrated-optic waveguide device with a membrane in contact with the core.

FIG. 1b demonstrates what happens when a potential difference is applied between membrane 22 and electrode 12, causing an electrostatic attraction between them. The membrane 22, which is supported by spacer 18, is attracted to the electrode 12 electrostatically, causing the membrane to deform towards the electrode. The membrane 22 does not have to be supported on all four sides, nor is it limited to a square or rectangular shape. The air gap 20 becomes smaller in volume because of the membrane's movement. The air in the gap can evacuate from the gap by the etch access holes in the membrane. In both of these cross-sections the light is shown moving in the direction of the arrow 26b or arrow 26a. When the membrane deflects it in general causes a change in both the real and imaginary parts of the effective index of the guided mode, offering the possibility of creating various devices.

The direction of propagation of the light becomes easier to distinguish when viewing the perspective drawing of the planar waveguide device in FIG. 2. Arrows 26a and 26b show that light could travel through the waveguide from right to left or left to right. Because of the manner in which the membrane 22 rests on the spacer layer 18, the light could also travel in the directions of the arrows 28a and 28b, or from front to back or back to front.

This drawing does not show the implanted region 12 in the substrate 10, because lower cladding layer 14 and core layer 16 are covering it. The open area inside of the edges formed by spacer layer 18 is the air gap 20. The air gap 20 is formed by an etch that enters the spacer layer through the etch access hole array, one of which is 24. For ease of viewing the air gap 20 and the dimension of the spacer layer 18, the membrane 22 is shown as if it were lifted off of the spacer layer. Because these devices are monolithically manufactured, this really is not true. The membrane is actually an integral part of the device, not a removable component as shown.

FIG. 3 shows a structure for limiting the direction the light can travel through the device. In the cross-sectional view, a ridge 30 is placed in the core 16. The ridge's width runs along the axis defined by the arrows 26a and 26b, and its length runs the length of the device. The ridge can be made of the same material, as implied in the drawing, or of a different material deposited before the spacer layer is laid down. The ridge causes a difference in the effective index of refraction and thus creates a channel that confines light in the lateral direction, inside the box formed by the ridge.

Figure 4:
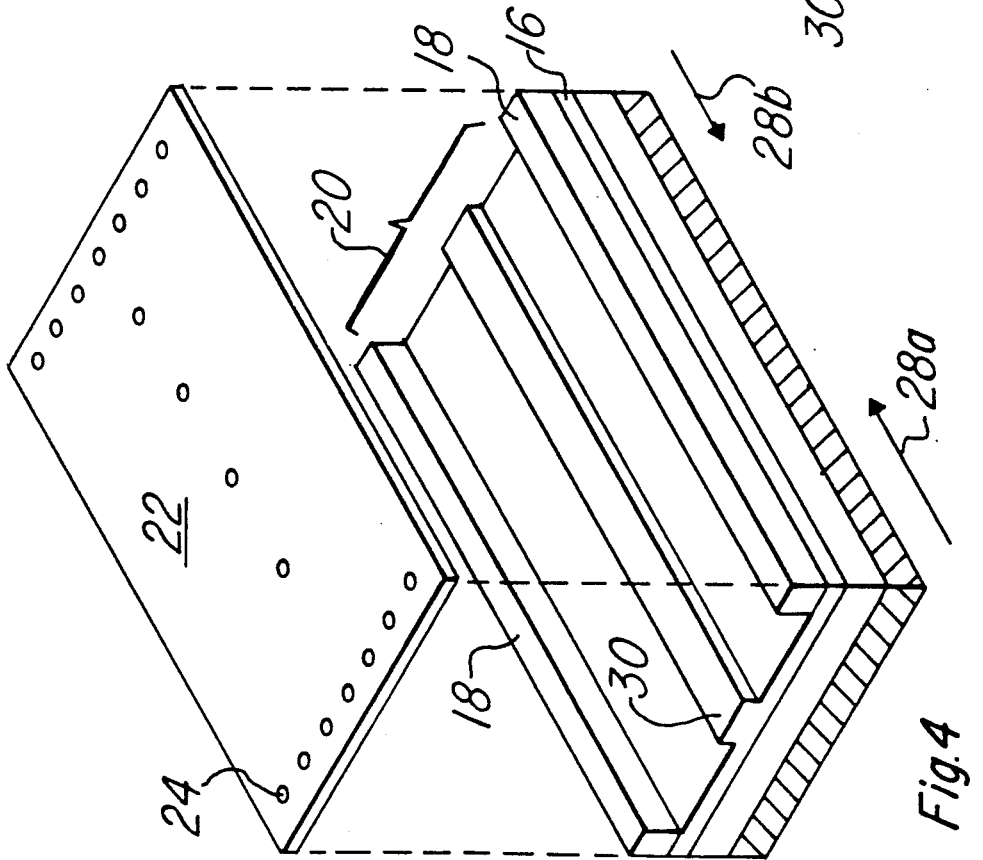
FIG. 4 shows a perspective view of a channelized waveguide device.

In FIG. 4 the ridge 30 is shown as it would appear if the membrane were removed. In this embodiment, the etch access holes 24 have been set closer to the front and back edges of the membrane. This causes the spacer layer 18 to be transformed from a hollow box as in FIG. 2, to a set of pontoons that support the membrane along two opposite edges that are parallel to the axis of the channel waveguide. This type of support structure could be used for all devices of this type, including planar waveguides. The air can now flow out the ends when the membrane 22 is drawn downward towards the core 16. One advantage of using only two edges for support is that transitions from cladded to uncladded regions for the light are eliminated, thereby reducing scattering losses.

The basic structures above can be used to change the imaginary parts of the refractive index, creating many devices some of which are a switchable polarizer, an ON/OFF switch, or a variable attenuator.

An ON/OFF switch can be effected by creating sufficient loss in the waveguide so that essentially no light is transmitted. The loss is created by the membrane when it comes into proximity or contact with the core. The light is then absorbed by the metal, turning it "OFF".

The device could be operated as a switchable polarizer as follows. When light of random polarization enters the waveguide, it could be polarized into transverse electric, or TE polarized, light by changing the relative proximity of the membrane. The metal membrane absorbs more of the transverse magnetic, or TM polarized, light, causing the resultant light to be substantially TE polarized. The buffer layer 17 in FIG. 1a can be formed at an optimum thickness to maximize the extinction ratio.

Figure 5:
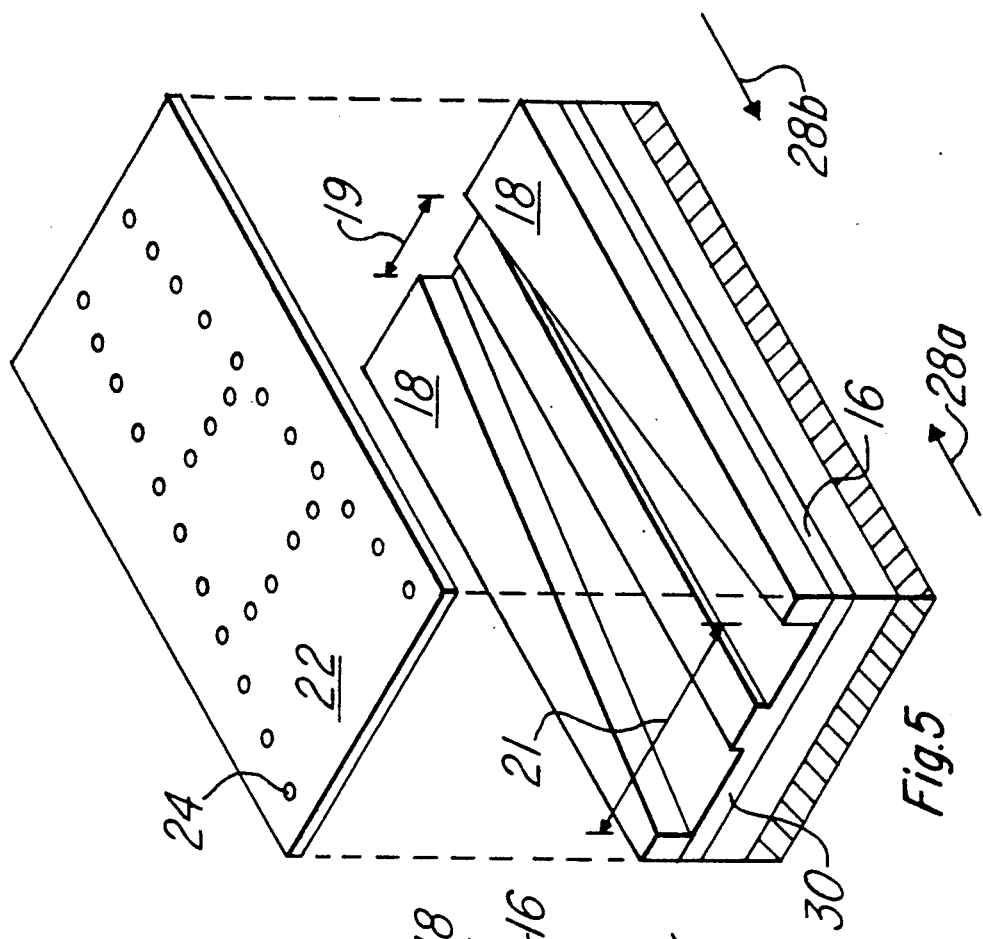
FIG. 5 shows a perspective view of a variable attenuating device.

FIG. 5 shows a perspective view of a variable attenuator. In this embodiment, the distance 19 is considerably smaller than distance 21. This causes the metal to be brought into proximity with the waveguide core at the wider end of the device with lower voltages than at the narrower end. The difference in the two distances 19 and 21 may be caused by a change in the positions of the access holes 24 in the membrane. The spacer 18 is then formed in such a manner as to cause the different membrane widths. At a given voltage, the membrane will be in proximity to the core starting from the wider end and going to an intermediate point along the device. The location of this intermediate point is dependent on the value of the applied voltage. The variation in the amount of membrane brought into proximity with the core along the length of the channel causes a controllable variable attenuation of the light, where the amount of attenuation is called by the amount of the membrane in contact with the device, which, in turn, is controlled by the value of the voltage applied to the electrode. Just as the ON/OFF switch can be operated as a switchable polarizer, this variable attenuator could be operated as a variable polarizer.

Devices can also be created that operate by changing the real part of the refractive index. Some of these devices are directional coupler switches, switchable Bragg reflectors, deflectors and filters, and mode converters. Note that in all devices which operate primarily by changing the real part of the refractive index, it may be desirable to use a dielectric buffer layer 17 on top of the core to reduce the absorption losses due to the metal membrane.

Figure 6:
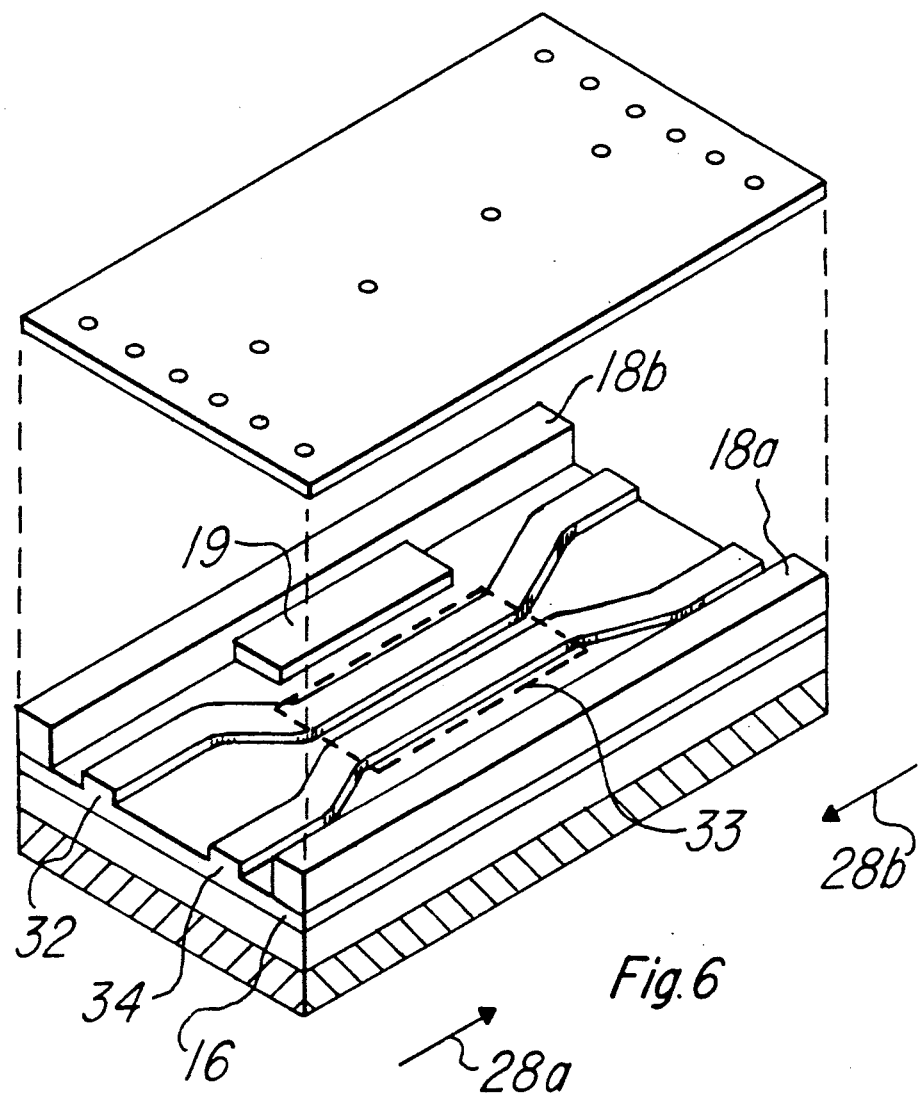
FIG. 6 shows a perspective view of a directional coupler waveguide device.

A directional coupler device, shown in FIG. 6, can be made by bringing two channel waveguides 32 and 34 into close lateral proximity for a length known as the coupling region, indicated by dashed box 33. The evanescent tail of the lateral optical mode profile of each waveguide extends into the other and results in a coupling of the two modes. The local coupling strength depends on the separation of the two waveguides, and determines the required length of the coupling region. In addition to the coupling strength, the transfer efficiency of light from one waveguide to the other depends on the difference in propagation constants of the modes of the two guides. Complete transfer of light from one waveguide to the other is possible only if the difference in propagation constants is zero. However, for any value of the coupling strength, the transfer efficiency can be made zero, resulting in all of the output light remaining in the same waveguide as the input, by causing an appropriate mismatch in propagation constants. Such a mismatch can be imposed, for example, by deflecting the membrane in such a way as to cause it to come into closer proximity with one of the coupled waveguides than the other, as discussed below. Of course, alteration of the transfer efficiency over ranges other than 100% to 0% is possible. With this choice of transfer efficiencies, however, the device constitutes a useful routing type of switch for optical signals. Because directional couplers are also wavelength- and polarization-sensitive, variations of this device can be used for switchable wavelength or polarization filtering.

A means for implementing a switchable directional coupler is illustrated in FIG. 6, in which a non-etching auxiliary spacer layer 19 is deposited of thickness and patterned in such a way as to prevent the metal membrane from coming into as close proximity with the left coupled waveguide as with the right. An alternative means of imbalancing the membrane proximity might be to offset the center of the etched-out area under the membrane from the centerline of the coupled waveguide pair. Depending on the length of the coupling region and the required length of contact of the membrane, in these devices the membrane may or may not completely cover the coupling region.

Figure 7:
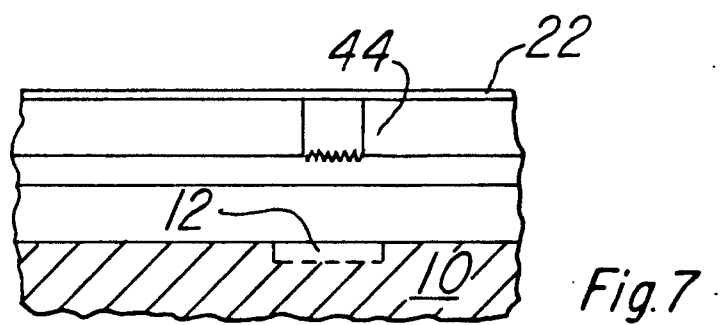
FIG. 7 shows a cross-sectional view of a switchable Bragg device.

A possible structure for the Bragg devices previously mentioned is shown in FIG. 7. The waveguide effective index can be periodically modulated under the deflectable portion of the membrane by some means such as a deposited or etched corrugation on the core layer, forming a grating 46. Various types of grating are possible, which can be configured to act as mirrors, deflectors or couplers. Because the diffraction properties of such a grating are also wavelength- and polarization-sensitive, these structures can be used in a number of wavelength- or polarization-sensitive devices. The wavelength at which a Bragg grating reflects depends on the periodicity of the grating. Since the effective periodicity is altered by a change in the real part of the effective index of the grating structure, a deflection of the membrane which changes the effective index can induce a change in the diffraction properties of the grating device. Thus a structure like the one shown in FIG. 7 can be used to make switchable filters, deflectors, or couplers, in which the wavelength or polarization of peak reflection, or the angle of deflection of guided beams is controlled by the state of deflection of the membrane. There are also devices in which the periodicity of the grating may be quite long, because the grating couples modes of nearly-equal effective index, such as in TE-TM mode converters. For these cases, instead of fabricating a fixed grating on the core, it may suffice to form a series of membrane devices of the type of FIGS. 2 or 4 along the waveguide length, which, when the membranes are deflected, themselves constitute a switchable grating.

Figure 8:
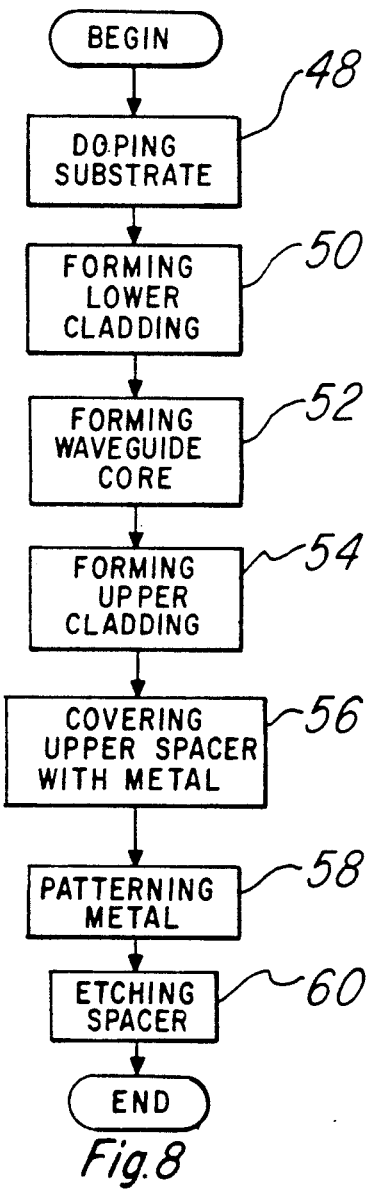
FIG. 8 shows a process for manufacturing a membrane device.

A process flow such as that shown in FIG. 8 is used to produce membrane devices. The process begins at step 48 with an implantation or diffusion to dope the substrate. This doping, which may be blanket or patterned, defines the lower electrode 12 shown in FIG. 1. As part of this step, a drive-in diffusion may be necessary to ensure that the dopant extends deep enough so as not to be consumed by the oxidation step which is used to form the lower cladding. Next, the lower cladding 14, possibly $SiO_2$, is formed in step 50 for example, by a thermal oxidation of the silicon substrate. The planar waveguide core 16 is formed in step 52 possibly by a low pressure chemical vapor deposition of $Si_3N_4$. Membrane DMD fabrication begins with the deposition of a polymer spacer 18 in step 54 which may double as the upper cladding layer of the waveguide. This spacer is hardened by baking or UV curing, and the DMD membrane is deposited on the spacer in step 56 by sputtering or evaporating a thin tensile film 22 of aluminum alloy. This film is patterned and etched in step 58 with an array of tiny access holes 20 through which the polymer can be etched. By using an isotropic selective etch, such as a plasma etch, the polymer spacer is removed in step 60 in the region of the membrane containing the access holes, but it remains elsewhere to support the membrane. Thus we are left with a thin metal membrane supported over an exposed portion of the waveguide. This membrane can be electrostatically deflected by application of a voltage between the membrane and the underlying electrode.

Figure 9A:
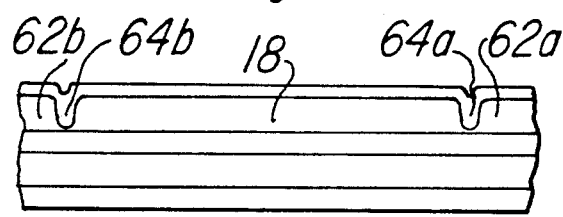
FIG. 9a and 9b show an alternate membrane structure.
Figure 9B:
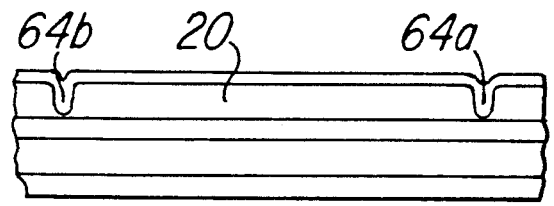

An alternative method of building the membrane DMD makes it possible to completely remove the spacer, an example of which is shown in FIG. 9a. After the spacer 18 is deposited, vias 62a and 62b are patterned in it. When the membrane film is deposited it contacts the layer under the spacer in the vias, forming supports 64a and 64b. The membrane is patterned as described above. When the spacer is etched, it can be completely removed, leaving the membrane supported by metal supports 64a and 64b over air gap 20 shown in FIG. 9b. This method eliminates the need for a controlled spacer etch.

Several variations on this flow are possible, corresponding to the various device configurations discussed previously. For example, the implanted electrode may be replaced by a metal electrode. A method of achieving this would be to etch recesses into the core and lower cladding after the waveguide core layer is deposited. An electrode metal film is deposited and etched to form electrodes in the recesses. The recesses allow the membrane, when deflected, to intimately contact the waveguide core. A thin insulating layer must also be deposited over the electrode to prevent it from shorting to the deflected membrane. DMD membrane fabrication would then follow as described above.

Additionally, the array of plasma access holes may be extended to the edge of the membrane along the axis parallel to the direction of light propagation. When the spacer is etched, polymer spacer will remain only along the sides of the membrane, so that no polymer is in contact with the waveguide core along the path of light propagation, as in FIG. 4.

Furthermore, the planar waveguide in FIG. 1 may be replaced by the channel waveguide in FIG. 3. A ridge can be patterned and etched into the core, or dielectric loading strips can be deposited and patterned onto the core. An alternative means of forming a channel waveguide could be by diffusion of a species which raises the refractive index into the core or lower cladding, forming a partially buried waveguide.

A dielectric buffer layer 17 in FIG. 1 may be deposited on the core to enhance the device operation. This layer should be of a material that will not etch during the etching of the spacer. Also, an auxiliary spacer layer 19 from FIG. 6 could be deposited and patterned after the core layer. This material should also not etch during the etching of the spacer. After any of the above modifications, the DMD process continues as initially discussed.

These devices can all be manufactured monolithically, lowering defects and improving yield. The process is relatively inexpensive, providing reasonably priced, reliable devices that have many uses. The structure can be used in device which rely on changes in either or both of the real or imaginary parts of the effective refractive index.

Thus, although there has been described to this point a particular embodiment for an integrated-optic waveguide device, it is not intended that such specific references be considered as limitations upon the scope of this invention except in-so-far as set forth in the following claims.

What is claimed is:

1. A method of manufacturing an integrated-optic device comprising:
   a. defining an electrode in a substrate;
   b. forming a lower cladding upon said substrate;
   c. forming a waveguide core upon said lower cladding;
   d. forming a spacer layer upon said core;
   e. covering said spacer layer with a metal film;
   f. patterning said film with an array of access holes; and
   g. etching to remove some or all of said spacer layer.

2. The method of claim 1 wherein said defining step comprises implanting an electrode.

3. The method of claim 1 wherein said defining step comprises diffusing an electrode.

4. The method of claim 1 wherein said defining step comprises etching said substrate and patterning it with metal.

5. The method of claim 1 wherein said forming a lower cladding step comprises thermal oxidation of said substrate.

6. The method of claim 1 wherein said forming a waveguide core step comprises low pressure chemical vapor deposition of $Si_3N_4$.

7. The method of claim 1 wherein said covering step comprises sputtering said metal.

8. The method of claim 1 wherein said covering step comprises evaporating said metal.

9. The method of claim 1 wherein said etching to remove said spacer step comprises a plasma etch.

10. The method of claim 1 wherein said forming a waveguide core step includes forming a ridge in said core.

11. The method of claim 1 wherein said forming a waveguide core step includes forming a buffer layer upon said core.

12. The method of claim 1 wherein said forming a waveguide core step includes forming a region of material that does not etch during said etching step leaving a small protrusion into the region where said spacer is removed.

13. The method of claim 1 wherein said forming a spacer layer step includes patterning said spacer so as to cause said covering step to form metal posts.

* * * * *

UNITED STATES PATENT AND TRADEMARK OFFICE
CERTIFICATE OF CORRECTION

PATENT NO. : 5,178,728
DATED : 1/12/93
INVENTOR(S) : Robert M. Boysel, Gregory A. Magel It is certified that error appears in the above-indentified patent and that said Letters Patent is hereby corrected as shown below:

Column 1, line 5 under the title
   "Integrated-Optic Waveguide Devices and Method"
Add
—Notice:   The U.S. Government has a paid-up license in this invention and the right in limited circumstances to require the patent owner to license others on reasonable terms as provided for by the terms of contract no. F30602-89-C-0174 awarded by U.S. Air Force Rome Laboratory, Griffiss Air Force Base, Rome, New York.—

Signed and Sealed this

Eleventh Day of August 1998

Attest:

BRUCE LEHMAN

Attesting Officer    Commissioner of Patents and Trademarks